United States Patent
Wallin (10) Patent No.: US 12,338,996 B2
(45) Date of Patent: Jun. 24, 2025

(54) SYSTEM FOR RECOVERING HEAT FROM FLUE GAS, CONTROL ARRANGEMENT FOR USE IN SUCH A SYSTEM AND A METHOD PERFORMED BY SUCH A CONTROL ARRANGEMENT

(71) Applicant: VALMET AB, Sundsvall (SE)

(72) Inventor: Erik Wallin, Kullavik (SE)

(73) Assignee: VALMET AB, Sundsvall (SE)

( * ) Notice: Subject to any disclaimer, the term of this patent is extended or adjusted under 35 U.S.C. 154(b) by 861 days.

(21) Appl. No.: 17/438,078

(22) PCT Filed: Mar. 11, 2020

(86) PCT No.: PCT/SE2020/050265
§ 371 (c)(1),
(2) Date: Sep. 10, 2021

(87) PCT Pub. No.: WO2020/185154
PCT Pub. Date: Sep. 17, 2020

(65) Prior Publication Data
US 2022/0186927 A1    Jun. 16, 2022

(30) Foreign Application Priority Data
Mar. 12, 2019   (SE) .................................. 1950307-7

(51) Int. Cl.
| F23G 7/10 | (2006.01) |
| D21C 11/12 | (2006.01) |
| F22B 35/00 | (2006.01) |

(52) U.S. Cl.
CPC ................ *F23G 7/10* (2013.01); *D21C 11/12* (2013.01); *F22B 35/007* (2013.01); *F23G 2206/10* (2013.01)

(58) Field of Classification Search
None
See application file for complete search history.

(56) References Cited

U.S. PATENT DOCUMENTS 1,555,465 A * 9/1925 Forner .................... F01K 3/008
60/659
2,000,009 A * 5/1935 Blunt ....................... F22D 1/42
417/339

(Continued)

FOREIGN PATENT DOCUMENTS

| EP | 3 179 059 A1 | 6/2017 |
| WO | WO-02/097243 A | 12/2002 |

(Continued)

OTHER PUBLICATIONS

Module 2.3: Control of Separation Processes [online], [retrieved on Sep. 11, 2019]. Retrieved from the internet, URL: http://homepages.ed.ac.uk/jwp/control06/controlcourse/restricted/course/third/course/module2-3.html, Dated with Wayback Machine.

(Continued)

*Primary Examiner* — David J Laux
(74) *Attorney, Agent, or Firm* — Foley & Lardner LLP (57) ABSTRACT

The present invention relates to a heat recovery system 10, 11, 12 for recovering heat from flue gas generated by combustion at a biomass plant installation. The heat recovery system 10, 11, 12 comprises a flue gas cooler 200 configured to receive flue gas 201 from a combustion and transfer heat from the flue gas 201 to feed water in a heat recovery fluid circuit 101. The feed water in the heat recovery fluid circuit 101 is taken from and returned to a feed water main system. The feed water main system could be provided with a feed water tank 100 to which a heat recovery circuit inlet 112 and a heat recovery circuit outlet are connected. Further, the heat recovery system comprises a waste heat accumulator 300 configured to receive feed water, heated by flue gas 201 in a flue gas cooler 200, and cool by flashing the received feed water in order to generate flash steam, and the heat recovery system 10, 11, 12 comprises a control arrangement 533. Further, the present inven- (Continued)

tion also relates to a method performed by the control arrangement for use in recovering heat from flue gas generated by combustion at a bio plant installation.

16 Claims, 4 Drawing Sheets

(56) References Cited

U.S. PATENT DOCUMENTS

| | | | |
|---|---|---|---|
| 2,029,360 A | 2/1936 | Dean | |
| 4,455,614 A * | 6/1984 | Martz | F01K 23/10 |
| | | | 290/40 R |
| 4,491,093 A | 1/1985 | Hoekstra | |
| 4,501,233 A * | 2/1985 | Kusaka | F01K 23/108 |
| | | | 122/420 |
| 9,657,941 B2 * | 5/2017 | Tsantrizos | C10J 3/02 |
| 10,501,343 B1 * | 12/2019 | Hoefferle | B01J 49/85 |
| 2008/0131334 A1 * | 6/2008 | Kawamura | F23G 5/24 |
| | | | 422/169 |
| 2008/0276844 A1 * | 11/2008 | Yamamoto | F23C 6/04 |
| | | | 110/345 |
| 2013/0145996 A1 * | 6/2013 | Cooper | F24H 1/009 |
| | | | 122/31.2 |
| 2016/0341447 A1 * | 11/2016 | Wyatt | F28F 13/12 |
| 2020/0378278 A1 * | 12/2020 | Mansikkasalo | F01K 11/02 |

FOREIGN PATENT DOCUMENTS

| | | | |
|---|---|---|---|
| WO | WO-2011/094663 A2 | 8/2011 | |
| WO | WO-2012042107 A2 * | 4/2012 | D21C 11/12 |
| WO | WO-2012042107 A3 * | 6/2013 | D21C 11/12 |
| WO | WO 2013/144438 A1 | 10/2013 | |
| WO | WO-2016/118067 A1 | 7/2016 | |

OTHER PUBLICATIONS

Luyben, W.L, Chien, I.L, "4.3 Controllers and Dynamic Elements" In: Design and Control of Distillation Systems for Separating Azeotropes, 2010, p. 113-129.
Extended European Search Report issued in EP Appl. No. 20770394.3 on Nov. 9, 2022.

* cited by examiner

SYSTEM FOR RECOVERING HEAT FROM FLUE GAS, CONTROL ARRANGEMENT FOR USE IN SUCH A SYSTEM AND A METHOD PERFORMED BY SUCH A CONTROL ARRANGEMENT

TECHNICAL FIELD

The present invention relates generally to a heat recovery system for recovering heat from flue gas, a control arrangement for use in such a heat recovery system and a method performed by such a control arrangement.

BACKGROUND ART

Flue gases generated within a combustion process in e.g. a recovery boiler in a biomass processing installation contain a large amount of energy in the form of heat. Instead of discharging the heated flue gases directly to the atmosphere and lose the energy, the heat from the flue gases may be recovered e.g. by means of a flue gas cooler. The flue gases generated in the combustion process are led to an economizer situated after the recovery boiler, which economizer heats feed water for the recovery boiler. When the flue gases have passed through the economizer, the flue gases are introduced into a filter wherein the flue gases are cleaned, where after the heat may be extracted from the hot flue gases and be used for e.g. process heating, electricity generation or for any distinct heating. Low pressure steam may be saved by recovering some of the heat in the flue gases by means of a flue gas cooler situated after the filter and introduce the recovered heat to a steam net within the biomass processing installation.

In prior art it is known biomass processing systems which recover heat from process steps within e.g. recovery boilers. One such system is known from WO2012/042107, which describes a method for recovering heat from flue gases generated in combustion devices at a biomass-based plant. The method to recover heat from flue gas includes; directing flue gas from a combustion device through a flue gas cooler; heating a circulation liquid in the flue gas cooler with heat from the flue gas, and transporting the heated circulation liquid to a waste heat accumulator; flash cooling the heated circulation liquid in the waste heat accumulator; extracting from the waste heat accumulator flash steam from the flashing of the heated circulation liquid; returning the flash-cooled circulation liquid from the waste heat accumulator to the flue gas cooler. Further, the pressure in the waste heat accumulator is regulated by the flow of circulation liquid, which is introduced into the flue gas cooler, and the flow of circulation liquid is controlled with circulation pumps, which are adjusted based on the pressure data obtained from a pressure sensor measuring pressure of flash steam generated from flashing the circulation liquid in the waste heat accumulator.

One of the drawbacks with this system is that the regulation of the pressure in the waste heat accumulator is based on instantaneous pressure of circulation liquid which is introduced into the flue gas cooler. Thus it is difficult to monitor flashing of the circulation liquid in the waste heat accumulator, based on this instantaneous pressure parameter, which is measured way in advance before the circulation liquid enter the waste heat accumulator again. Thus, in the downstream circulation loop through the flue gas cooler, there may occur pressure and/or temperature losses of the circulation liquid, which there are no possibility to influence within the downstream points of the circulation loop since the parameter which regulates the pressure of the circulation fluid entering the waste heat accumulator has already been measured.

Further, WO2012/042107 comprises a control system which particularly controls the flue gas heat recovery. The control system may be completely computer based or be manually implemented by technicians monitoring the sensors monitoring the flue gas heat recovery system. The control system regulates the major part of the parameters within the system, and a drawback with this is that the system becomes overregulated and is not susceptible for any parameter variations within the system which creates a very complex process to control.

Another drawback with the system described in WO2012/042107 is that if the output of flash steam from the waste heat accumulator is too low in relation to the flow of flue gas from the recovery boiler, during operation, there is an impending risk that the recovery boiler will be overheated and boil, which is a hazardous state which is not desirable. The system described in WO2012/042107 maintains the water level within the waste heat accumulator by means of a continuous supply of make-up water through a make-up water inlet. Further, the make-up water is circulated within the system and successively transformed into steam. Since make-up water is supplied into the system from an external water supply, the system is also supplied with additional salts. While the water is transformed into steam, the additional supplied salts accumulates within the system and results in an increased concentration of salt in the circulating water, which is not desirable. Hence, there is thus a desire for an improved process and system for recovering heat from flue gases generated in combustion devices at a biomass-based plant which avoid accumulation of salts and impurities in the heat recovering media and may be controlled in an efficient manner.

SUMMARY OF INVENTION

An object of the present invention is to create a heat recovery system for recovering heat from flue gas, a control arrangement for use in such a system and a method performed by such a control arrangement which will overcome the above described drawbacks.

According to a first aspect of the invention, there is provided a heat recovery system for recovering heat from flue gas generated by combustion at a biomass plant installation. The heat recovery system comprises a heat recovery fluid circuit which uses feed water as a heat carrier. The feed water in the heat recovery fluid circuit is redirected from a feed water main system to enter the heat recovery fluid circuit at a heat recovery system inlet. Feed water is returned from the heat recovery fluid circuit to the feed water main system via a heat recovery circuit outlet. Hence, the water used as a heat carrier in the heat recovery system will be taken from a feed water main system mainly comprising fresh feed water, possibly mixed with a small fraction of feed water recirculated back to the feed water main system from the heat recovery fluid circuit. The heat recovery system comprises a flue gas cooler configured to receive flue gas from combustion. Feed water entering the heat recovery fluid circuit through the heat recovery circuit inlet will be guided to the flue gas cooler in order to transfer heat from the flue gas to the feed water flowing in the heat recovery fluid circuit. The heat recovery system further comprises a waste heat accumulator located downstream of the flue gas cooler and the waste heat accumulator is configured to receive said feed water, heated by said flue gas in said flue gas cooler, via a waste heat accumulator inlet. Feed water entering the waste heat accumulator via said waste heat accumulator inlet will vaporize by flashing in order to generate flash steam. In general, only a portion of the feed water entering the waste heat accumulator will vaporize while another portion of the feed water will remain in liquid state upon entering the waste heat accumulator. The waste heat accumulator is designed to comprise a mixture of steam and water and comprises a steam outlet and a liquid outlet. As is obvious, the steam outlet is preferably provided in the upper portion of the waste heat accumulator and the liquid outlet in the lower portion of the waste heat accumulator. The steam outlet could for example be connected to a steam net such that the steam may be used for heating or any suitable purpose in the biomass plant installation. The liquid outlet is preferably connected to the feed water main system such that feed water from the heat recovery system is returned to the feed water main system.

According to one embodiment, the feed water main system comprises a feed water tank from which feed water is pumped by a pump located downstream of the feed water tank. Downstream of the pump is the feed water flow divided such that a portion of the feed water is redirected to the heat recovery fluid circuit in the heat recovery system while a main portion of the flow will be guided further through the feed water main system, e.g. to be used in a furnace or other feed water demanding appliance. In the heat recovery system is the flue gas cooler located downstream of the heat recovery circuit inlet. The flue gas cooler is arranged to guide flue gases to be in heat exchanging contact with the heat recovery fluid circuit in order to heat a flow of feed water flowing through the flue gas cooler before the feed water reaches the waste heat accumulator located downstream of the flue gas cooler. Feed water is admitted to the waste heat accumulator via a waste heat accumulator inlet and may either flash to transform to steam and eventually flow out from the waste heat accumulator via said steam outlet or maintain its liquid state such that the feed water will eventually flow through the waste heat accumulator liquid outlet. The liquid outlet is connected via the heat recovery fluid circuit to the feed water main system. There is preferably a pump and/or one or several flow regulating valves provided in the heat recovery fluid circuit between the waste heat accumulator and the heat recovery circuit outlet in order to control the liquid flow from the waste heat accumulator back to the feed water main system. The heat recovery circuit outlet outlet may be connected to the feed water main system upstream of the feed water tank. Hence, heat recovered in the flue gas cooler by the heat carrying liquid may be transferred back into the biomass processing system via the liquid return flow to the feed water main system and the feed water tank in addition to regain heat from the flash steam produced in the waste heat accumulator.

Further, the heat recovery system comprises a control arrangement including an accumulator inlet controller for control of the flow of feed water into the waste heat accumulator. In general, the accumulator inlet controller aims at controlling the steam pressure in the waste heat accumulator to be maintained at a desired level. The accumulator inlet controller comprises a steam sensor for measuring at least one of the pressure or temperature of the steam in the waste heat accumulator. In general, pressure is the most relevant parameter but since a pressure easily may be derived from a temperature measurement, a temperature value could be used to derive the pressure. As will be further explained below, the control arrangement usually includes further controllers for controlling the different flows in the heat recovery system, e.g. an accumulator steam outlet controller and accumulator liquid outlet controller controlling flows of steam and liquid from the waste heat accumulator. The above mentioned controllers could be linked together and controlled from a central control unit, being controlled separately or a mixture thereof, e.g. different controllers could be using the same sensors or transfer relevant data from one controller to another, e.g. opening degree of a valve or pump velocity (rpm).

In an embodiment the heat recovery system further comprises a return flow heat exchanger configured to receive any process fluid from any process fluid source and feed water from the waste heat accumulator, said heat exchanger located in the heat recovery fluid circuit between the waste heat accumulator liquid outlet and the heat recovery circuit outlet wherein the heat exchanger is further configured to transfer heat from the feed water to the any process fluid such that temperature difference between the cooled off feed water in the heat recovery circuit and feed water in the feed water tank is reduced.

In another embodiment the heat recovery system further comprises an inflow heat exchanger located in the heat recovery fluid circuit downstream of the heat recovery circuit inlet and upstream of the waste heat accumulator in order to receive feed water taken from the feed water main system. The inflow heat exchanger is configured to receive any process fluid to be heat exchanged with the feed water in the heat recovery fluid circuit. In particular, the inflow heat exchanger may be suitably used for heating a liquid which may be used as makeup water to be fed to the feed water main system. If the heat exchanger is used for makeup water, the inlet of the makeup water to the feed water main system is preferably located upstream of the heat recovery circuit inlet. Hence, make up water will be added to the main feed system and not directly to the heat recovery fluid circuit according to one aspect of this embodiment. The inflow heat exchanger is further configured to transfer heat from the feed water to the makeup water such that a temperature difference between the makeup water and the feed water is reduced. The inflow heat exchanger may be used together with the return flow heat exchanger or in a system without a return flow heat exchanger.

A second aspect of the present invention relates to a method performed by a control arrangement for use in recovering heat from flue gas generated by combustion at a biomass plant installation, the method comprises the use of an accumulator liquid inlet controller determining at least one of a pressure and temperature of generated flash steam in a waste heat accumulator; and controlling transport of feed water, heated by flue gas in a flue gas cooler, being provided to the waste heat accumulator in dependence of the determined temperature and/or pressure in the waste heat accumulator in order to maintain a desired pressure of the steam in the waste heat accumulator.

The controlling within the method may further comprise controlling a waste heat accumulator inlet valve for control of feed water admitted to the waste heat accumulator. The waste heat accumulator inlet valve forms part of the accumulator liquid inlet controller which also comprises a steam sensor for measuring the temperature and/or pressure of the steam in the waste heat accumulator. The accumulator inlet valve may be located anywhere in the heat recovery liquid circuit between the heat recovery circuit inlet and the accumulator liquid inlet. However, the accumulator inlet valve is preferably located between the flue gas cooler and the accumulator liquid inlet and may for example be located in the vicinity of the accumulator liquid inlet. The relevant parameter or parameters sensed by the steam sensor and/or the position of the accumulator inlet valve could be used as input also for control of other flows in the system, e.g. to control the flow of feed water by the main system pump from which a flow of feed water is redirected for providing feed water to the flue gas cooler.

Advantageously, the waste heat accumulator inlet valve is never completely closed, to ensure that there is always a flow of feed water through the flue gas cooler in order to prevent overheating of the flue gas cooler.

The method may further comprise extracting generated flash steam from the waste heat accumulator into a steam net based on at least one of a desired steam pressure or temperature of the steam in the waste heat accumulator. In general, the system is controlled in dependence of the pressure in the waste heat accumulator and the steam net and the pressure of the steam in the waste heat accumulator is controlled to be at the same level or higher than the pressure in the steam net.

Further, the method may further comprise closing a non-return valve if the pressure in the waste heat accumulator is below the pressure within the steam net.

According to a third aspect of the present invention, a control arrangement for use in recovering heat from flue gas generated by combustion at a biomass plant installation is provided. The control arrangement comprises an accumulator liquid inlet controller which is configured to determine at least one of a pressure and temperature of generated flash steam in a waste heat accumulator, and to control at least one of the pressure and temperature by controlling transport of feed water, heated by flue gas in a flue gas cooler, being provided to the waste heat accumulator.

In a preferred embodiment the control arrangement is further configured to control the flow of feed water by controlling a waste heat accumulator inlet valve in the accumulator liquid inlet controller for the feed water to the waste heat accumulator. In addition, the flow may be further controlled by controlling a feed water pump providing feed water to the flue gas cooler.

Advantageously, the waste heat accumulator inlet valve is never completely closed, to ensure that there is always a flow of feed water through the flue gas cooler.

In a preferred embodiment the control arrangement is further provided with an accumulator steam outlet controller configured to control the flow of generated flash steam from the waste heat accumulator, e.g. into a steam net, based on at least one of a desired steam pressure or temperature of the steam in the waste heat accumulator. In case the accumulator steam outlet is connected to a steam net, the flow is preferably controlled in dependence of the pressure in the steam net. The flow of steam may be controlled by the use of a waste heat accumulator steam non-return valve arranged to only allow steam within a certain pressure interval or above a certain pressure to flow through the accumulator steam outlet. In general, the set pressure level or interval is dependent on the pressure in the steam net.

In a preferred embodiment the control arrangement is further configured to close the waste heat accumulator steam non-return valve if the pressure in the waste heat accumulator is below the pressure within the steam net.

BRIEF DESCRIPTION OF DRAWINGS

The invention is now described, by way of example, with reference to the accompanying drawings, in which.

DESCRIPTION OF EMBODIMENTS

In this context, the term "fluid" shall be construed broadly to incorporate all kinds of fluids in a recovery boiler system, such as flowing liquids as well as gaseous liquids.

In general, pulping processes within pulp industry are very energy-intensive and costly, and to lower the amount of inputted energy, it is a desire to improve the energy recovery from the pulping process. One way to regain energy is to recover heat from flue gases generated in a biomass plant installation e.g. in recovery boilers.

The biomass plant installation comprises a boiler furnace which processes the cellulose material which may be non-wood material or wood-based material. The flue gases contain energy in the form of heat, and it is desired to recover this energy from one process step and recycle the recovered energy into another process step within a system. Within the biomass plant installation, recovered heat in the form of large quantities of hot water is not so usable, instead it is desired to recover heat in the form of steam which is easier to recycle and reuse within different process steps of the biomass plant installation. Another advantage with recovering heat in the form of steam instead of hot water is that the dimensions of the piping system may be smaller, which in turn imply that the piping system becomes less bulky and inexpensive.

In the following, a detailed description of a heat recovery system 10, 11, 12, according to a first aspect of the invention is given. The heat recovery system 10, 11, 12 is configured for recovering heat from flue gas 201 generated by combustion at a biomass plant installation is given with reference to FIGS. 1-3. The heat recovery system 10, 11, 12 comprises a flue gas cooler 200 which is arranged downstream a filter used for cleaning the flue gases 201. The flue gas cooler 200 is configured to receive flue gas 201 from a combustion process at the same time as feed water in a heat recovery fluid circuit 111 is led through the flue gas cooler 200. Thus, the heat from the flue gas 201 heats the feed water in the heat recovery fluid circuit 111. The heat recovery fluid circuit 111 is connected to a feed water main system 101 by a heat recovery circuit inlet 112, where a portion of the main feed water flow is withdrawn from the feed water main system 101 and enters the heat recovery fluid circuit 111, and a heat recovery circuit outlet 113 where the feed water flow from the heat recovery fluid circuit 111 is returned to the feed water main system 101. The feed water main system 101 as disclosed herein comprises a feed water tank 100 from which a flow is induced by a feed water main system pump 102 located downstream of the feed water tank 100 in the feed water main system 101. Downstream of the main system pump 102 is the heat recovery circuit inlet 112 located such that a portion of the feed water in the feed water main system 101 may be directed into the heat recovery fluid circuit 111. The heat recovery fluid circuit 111 provides for fluid communication with the flue gas cooler 200, located downstream of the heat recovery circuit inlet 112, and a waste heat accumulator 300, which is located downstream of the flue gas cooler 200. The feed water heated by the flue gas cooler 200 is transported to the waste heat accumulator 300 via a waste heat accumulator inlet 305, wherein at least a portion of the feed water is cooled by flashing to steam. In general, the major portion of the feed water entering the waste heat accumulator 300 via the waste heat accumulator inlet 305 will remain in liquid phase such that there will be a mixture of steam and liquid in the waste heat accumulator 300. The waste heat accumulator 300 further comprises a waste heat accumulator steam outlet 537 through which flash steam is provided. In this case is the steam outlet 537 connected to a steam net 400. The steam net 400 may preferably be a low-grade steam net. Further, the waste heat accumulator 300 is provided with a waste heat accumulator water outlet 538 which is in fluid communication with the heat recovery circuit outlet 113 connected to the feed water main system 101. In the example described herein, the heat recovery circuit inlet 112 is located downstream of the feed water tank 100, and the main system pump 102 while the heat recovery circuit outlet 113 is provided upstream of the feed water tank 100. Hence, there will be a partially recirculating flow through the heat recovery system but since the flow through the heat recovery fluid circuit 111 is small compared to the total flow in the feed water main system 101, the risk of building up high salt concentrations or accumulating other undesired substances in the heat recovery fluid circuit 111 is low. Further, the remaining heat in the water which is not recovered as steam in the waste heat accumulator 300 is also reused, this since the feed water from the waste heat accumulator 300 which is fed to the feed water tank 100 does not need to be heated as much as the feed water from an external source having a lower initial temperature. It shall be noted that the heat recovery system 10, 11, 12 will work also in a main feed water system without a feed water tank 100. Likewise, the heat recovery circuit inlet 112 could be located upstream of the heat recovery circuit outlet 113, which may be considered in particular in a feed water main system with no feed water tank 100 located between the inlet 112 and the outlet 113. Such an arrangement would prevent feed water from being recirculated into the heat recovery liquid circuit 101.

Figure 1:
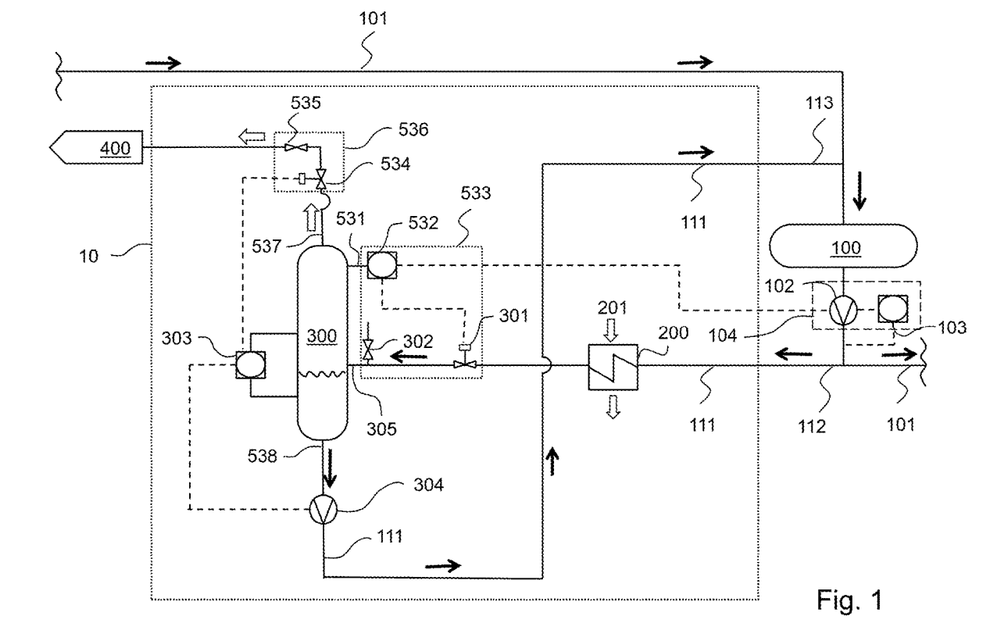
FIG. 1 shows a heat recovery system for recovering for recovering heat from flue gases in a flue gas cooler.
Figure 2:
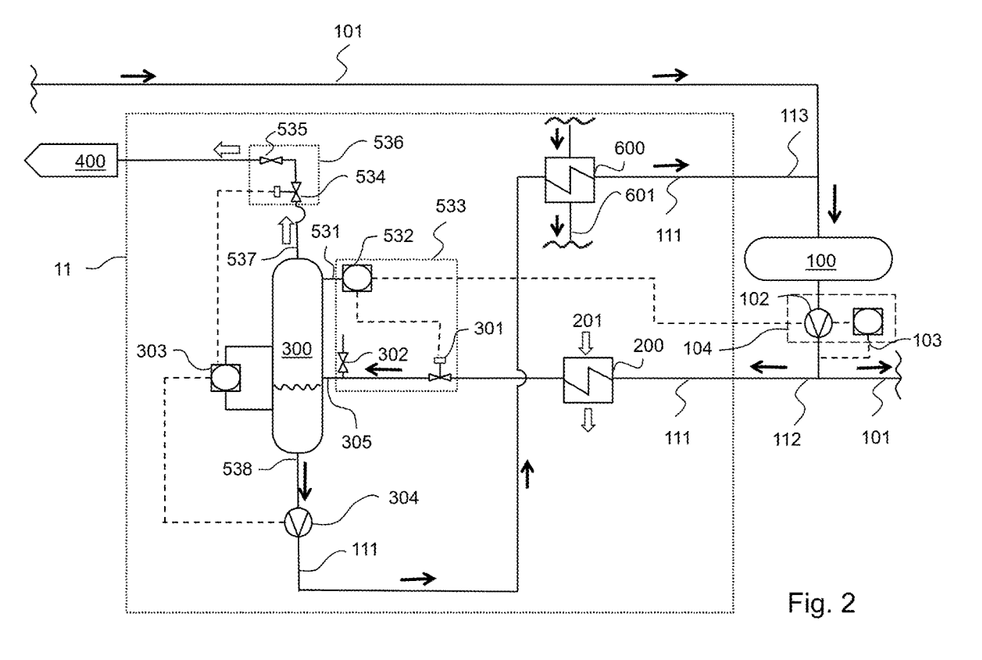
FIG. 2 shows a heat recovery system according to a second aspect of the invention including a first kind of additional heat exchanger.
Figure 3:
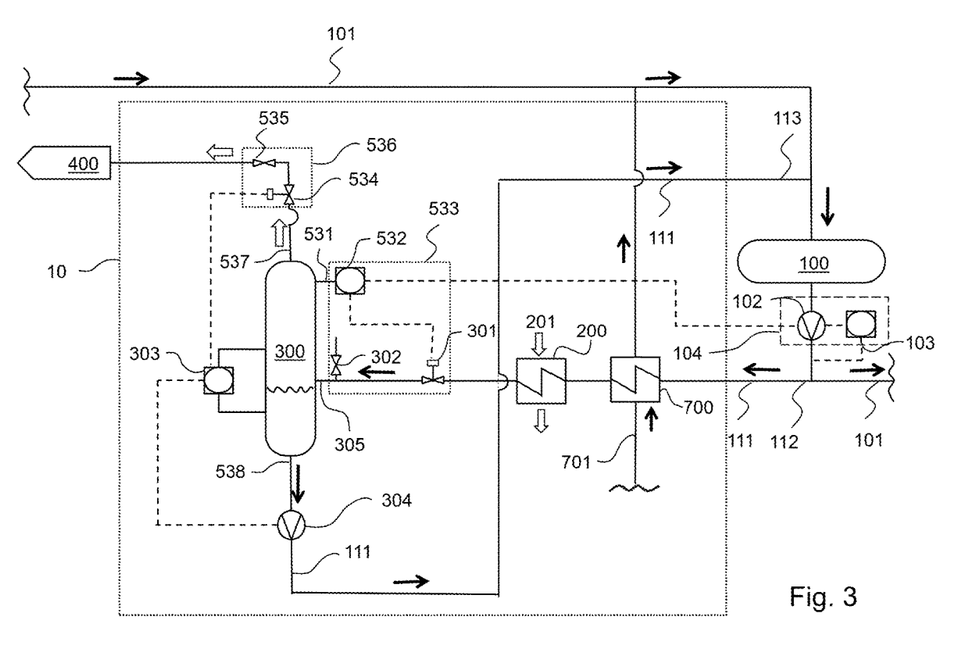
FIG. 3 shows the heat recovery system according to a third aspect of the invention including a second kind of additional heat exchanger.

Further the heat recovery system 10, 11, 12 comprises a control arrangement including an accumulator liquid inlet controller 533 for use in recovering heat from flue gas 201 generated by combustion in a biomass plant installation.

The accumulator liquid inlet controller 533 is configured to determine at least one of a pressure and temperature of generated flash steam in the waste heat accumulator 300 by a steam sensor 532, and to control transport of feed water, heated by flue gas 201 in the flue gas cooler 200, being provided to the waste heat accumulator 300. In general, it is desired to control the pressure of the steam within the waste heat accumulator and using measured values from the steam sensor 532 for at least one of the pressure and temperature of the generated flash steam for control of the liquid flow through the waste heat accumulator inlet 305.

The accumulator liquid inlet controller 533 is further configured to control the flow of feed water into the waste heat accumulator 300 via the waste heat accumulator inlet 305 by controlling an accumulator inlet control valve 301 and/or controlling the feed water main system pump 102 providing a flow of feed water in the feed water main system 101 and to the flue gas cooler 200. However, the main system pump 102, forming part of a main system flow controller 104, is in general controlled to provide flow at a specific, desired pressure for the feed water main system 101 and is therefore in general not intended to be used for varying the flow rate or pressure. The main system flow controller also includes a main system pressure sensor 103 located downstream of the main system pump 102 in order to control the main system pump 102 to deliver a flow corresponding to a desired pressure. Hence, depending on the feed water demand in the feed water main system 101 and the heat recovery fluid circuit 111, the main system pump will be controlled to deliver a flow with a desired pressure and thus provide a variable flow at constant pressure depending on the demand. Hence, depending on the demand for feed water in the heat recovery fluid circuit 111, the waste heat accumulator inlet valve 301 is controlled to be set to provide a desired flow to the waste heat accumulator inlet 305. Hence, the accumulator inlet control valve 301 is provided in flow communication with the flue gas cooler 200 and the waste heat accumulator 300 receiving feed water from the main system pump 102 via the heat recovery circuit inlet 112. Further, the accumulator inlet control valve 301 is arranged to regulate the pressure and flow of the feed water flowing into the waste heat accumulator 300.

The feed water main system pump 102 is located downstream of the feed water tank 100 in the feed water main system 101 and is used to pump feed water from the feed water tank 100 to provide a flow of feed water in the feed water main system 101 as well as to the heat recovery system 10, 11, 12. The feed water main system pump 102 is in connection with the main system pressure sensor 103, which measures the pressure of the feed water to be used in the feed water main system 101 and should in general have a desired, constant pressure to meet the demands for appliances connected to the main feed water system, e.g. for feed water directed to the furnace. The furnace needs to be fed with water with a certain pressure, and the main system pressure sensor 103 is configured to measure the pressure of the feed water. Thus, the feed water pump 102 will ensure that the feed water is provided with the certain pressure when fed to the feed water main system 101. Thus, the feed water main system pump 102 is self-regulating and controls the flow of feed water to the heat recovery system 10, 11, 12. In one embodiment the output pressure from the feed water pump 102 may be an intermediate pressure.

In one embodiment the feed water pump 102 may be replaced by a feed forward pump, of which inlet is in fluid connection with the feed water tank and of which outlet is configured to supply feed water for steam and temperation to the remainder of the biomass processing installation. Further, the outlet of this feed forward pump may also be in fluid communication with the feed water main system 101.

The control arrangement is further configured to control the flow of steam through the waste heat accumulator steam outlet 537 for extracting generated flash steam from the waste heat accumulator 300 into the steam net 400. The steam flow through the heat accumulator steam outlet 537 is controlled by an accumulator steam outlet controller 536 which controls the flow based on at least one of a desired steam pressure or temperature of the steam in the waste heat accumulator 300. The accumulator steam outlet controller 536 is in this case provided with a steam outlet non-return valve 535 which, in case the pressure of the generated flash steam is above the pressure of the steam net 400, the non-return valve 535 will remain open and the generated flash steam is fed to the steam net 400. In the case the pressure of the generated flash steam is below the pressure of the steam net 400, the non-return valve 535 will be urged to close, this to avoid that the water within the waste heat accumulator 300 will flow into the steam net 400. If water from the waste heat accumulator 300 would be fed into the steam net 400, the heat recovery system 10, 11, 12 would need to be immediately shut off. An unscheduled shut-off of the heat recovery system 10, 11, 12 is very costly, this since it is a time-consuming process to get the system up- and running again.

Further, the accumulator liquid inlet controller 533 may measure either pressure or temperature within the waste heat accumulator 300 since a pressure may be derived from a temperature measurement due to equilibrium within the waste heat accumulator 300. Thus, based on this the accumulator liquid inlet controller 533 may comprise a waste heat accumulator steam sensor outlet 531 connected to a waste heat accumulator steam sensor 532 which is designed to measure pressure and/or temperature of the steam in the waste steam accumulator. In the event the accumulator liquid inlet controller 533 measures pressure, the waste heat accumulator sensor outlet 531 communicates the pressure within the waste heat accumulator 300 to be measured by means of the waste heat accumulator steam sensor 532. The waste heat accumulator liquid inlet controller 533 could also be in communication with the main system flow controller 104 to send steam pressure data. Further, the waste heat accumulator steam sensor 532 is connected to the accumulator inlet control valve 301, which regulates the transport of feed water into the waste heat accumulator 300. The accumulator inlet control valve 301 forms part of the accumulator liquid inlet controller 533. Further, the heat recovery system 10, 11, 12 is provided with an accumulator inlet safety valve 302 arranged between the waste heat accumulator inlet 305 and the waste heat accumulator inlet control valve 301, which inlet safety valve 302 is configured to regulate the pressure of feed water into the waste heat accumulator 300. The inlet safety valve 302 will open and let out water in the case the pressure of the feed water fed into the waste heat accumulator 300 is too high. Further, the heat recovery system 11, 12, 13 is in this case connected to the steam net 400 of the biomass processing installation.

Further, the waste heat accumulator 300 is provided with a liquid outlet controller 304 which controls the flow of feed water from the waste heat accumulator water outlet 538 back to the feed water main system 101 and the feed water tank 100. The liquid outlet controller 304 is in this case represented by a pump which may be controlled to completely shut off or controlled to provide a desired flow of water from the waste heat accumulator 300. However, the liquid outlet controller 304 could be designed differently and comprise additional valves or other flow control arrangements as desired in order to provide a desired control of the flow of liquid from the waste heat accumulator 300. The liquid outlet controller 304 is connected to a level control unit 303, which detects the level of water within the waste heat accumulator 300 and sends control signals to the liquid outlet controller 304 in order to control the amount of water fed through the waste heat accumulator water outlet 538 and the water level in the waste heat accumulator 300. The level control unit 303 may for example be designed to have sensors for measuring liquid pressure at a fixed level and the pressure of the steam within the waste heat accumulator 300 in order to calculate the liquid level in the waste heat accumulator. Further, the accumulator steam outlet controller 536 comprises a steam outlet fail close valve 534 provided between the non-return valve 535 and the waste heat accumulator steam outlet 537. The fail close valve 534 is configured to close if a predefined high water level within the waste heat accumulator 300 is indicated, above which level there will be a risk for water entering and being fed to the steam net 400. It would imply a process fail if water is fed to the steam net 400, which would lead to that the steam net 400 would be more or less destroyed. In the vicinity of the inlet of the feed water tank 100 there may be provided a depressurization device. The depressurization device is configured to lower the pressure of the feed water fed into the feed water tank 100, this to avoid flashing of the feed water in the feeding piping located before the feed water tank 100. If the pressure within the piping located before the feed water tank 100 is too low in relation to the pressure within the feed water tank, and the temperature of the feed water in the piping is above the temperature of the feed water within the feed water tank 100, flashing may occur in the piping. Flashing in the piping is not desirable since this can be very noisy and cause severe erosion.

To avoid this the feed water is fed to the feed water tank 100 by means of pipes wherein the feed water may contain a pressure above the pressure within the feed water tank 100, thus the depressurization device is configured to lower the pressure of the feed water entering the feed water tank 100. Thus, flashing of the feed water will occur in the feed water tank 100 instead.

Further, the heat recovery system 11 (see FIG. 2) according to a second aspect of the invention may comprise a return flow heat exchanger 600 which is configured to receive any process fluid from any process fluid source 601 and feed water from the accumulator water outlet 538 of the waste heat accumulator 300, i.e. the return flow of feed water from the waste heat accumulator 300 to the feed water main system 101. Further, the return flow heat exchanger 600 is configured to transfer heat from the feed water to the any process fluid such that temperature difference between the cooled off feed water and feed water in the feed water tank 100 is reduced. Preferably, the temperature of the feed water within the feed water tank 100 is higher than the incoming feed water from the external feed water main system 101. Thus, the heat exchange within the return flow heat exchanger 600 is configured to allow lowering of the temperature of the feed water from the waste heat accumulator 300 to the feed water tank 100. This in turn will allow the temperature of the flue gas through the flue gas cooler 200 to be further lowered, this compared to the configuration of the heat recovery system 10 in FIG. 1.

The return flow heat exchanger 600 is provided between water outlet 538 of the waste heat accumulator 300 and the feed water main system 101. Further, the return flow heat exchanger 600 is located in the heat recovery fluid circuit 101 between the accumulator water outlet 538 and the inlet of the feed water tank 100, preferably downstream of the accumulator liquid outlet controller 304.

Further, the heat recovery system 12 according to another embodiment disclosed in FIG. 3 discloses an inflow heat exchanger 700 configured to receive any suitable process fluid from any process fluid source 701 and feed water from the feed water tank 100. Further, the inflow heat exchanger 700 is configured to transfer heat from the feed water fed from the feed water tank 100 to the any process fluid such that the temperature difference between the any process fluid and the feed water is reduced. If the temperature of the feed water from the waste heat accumulator 300 is higher than the temperature of the feed water within the feed water tank 100, the inflow heat exchanger 700 is configured to lower the temperature of the feed water coming from the waste heat accumulator 300 such that the temperature of the feed water from the waste heat exchanger 300 comprises a lower temperature than the water within the feed water tank 100. To be noted, such an arrangement will reduce the temperature difference between the different flows (as in any heat exchanging operation) regardless of which of the flows being hot or cold.

The any process fluid source 701 may be make-up water or any other fluid within the system which is to be subjected to interchange of heat. The inflow heat exchanger 700 is provided in the heat recovery fluid circuit 111 between flue gas cooler 200 and the feed water tank 100. Further, the inflow heat exchanger 700 is in fluid communication with the feed water tank 100 and the flue gas cooler 200. Further, the inflow heat exchanger 700 is in fluid communication with the feed water main system 100 via the feed water main system pump 102.

The feed water in the heat recovery system 10, 11, 12 is fed into the heat recovery fluid circuit 111 from an external feed water main system 101 via the heat recovery circuit inlet 112 and fed out from the heat recovery fluid circuit 111 through the heat recovery circuit outlet 113 back to the feed water main system 101. Since there is a continuous through flow of fresh feed water in the feed water main system 101 wherefrom the feed water to the heat recovery fluid circuit 111 is taken, and there is an output of the feed water to further appliances connected to the feed water system, the salt content contained in the inputted water from the external feed water main system 101 will not accumulate within the heat recovery fluid circuit 111 as may be the case for a closed system or a system using a large portion of recirculated feed water In this case, the proportion of feed water which is directed to the heat recovery fluid circuit 111 is small in comparison to the total throughput of feed water in the feed water main system 101 why there will not be any significant amounts of salts or other undesired impurities accumulated in the heat recovery fluid circuit even if the heat recovery circuit inlet 112 is located upstream of the heat recovery circuit outlet 113 in the feed water main system 101.

The invention is also directed to a method for use in recovering heat from flue gas 201 generated by combustion at a biomass plant installation, the method comprising the features of:

directing a flow of feed water from a feed water main system 101 to a heat recovery system 10, 11, 12 comprising a heat recovery fluid circuit 111. The heat recovery fluid circuit 111 comprises a flue gas cooler 200 and a waste heat accumulator 300 fluidly connected to each other. The heat accumulator is arranged downstream of said flue gas cooler 200 in the heat recovery liquid circuit 111. The flue gas cooler 200 is arranged to exchange heat between a flue gas 201 and feed water in the heat recovery fluid circuit 111 flowing through the flue gas cooler 201 in order to heat the feed water in the heat recovery fluid circuit 111 before said feed water enters the waste heat accumulator 300; and controlling said flow of feed water in the heat recovery fluid circuit 111 to a waste heat accumulator inlet 305 so as to generate flash steam in the waste heat accumulator 300 when the feed water enters through said waste heat accumulator inlet 305 in order to maintain a mixture of liquid and steam in said waste heat accumulator 300; and controlling a flow of steam from a steam outlet 537 in the waste heat accumulator 300; and controlling a flow of feed water from a water outlet 538 in the waste heat accumulator 300 to be returned to the feed water main system 101.

Figure 4:
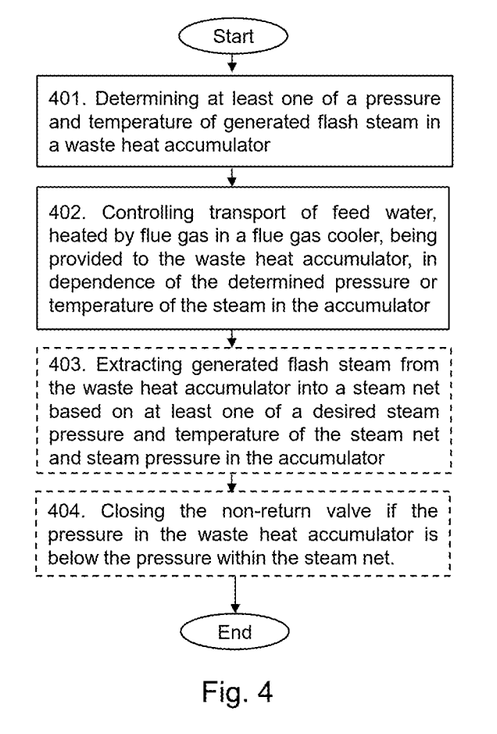
FIG. 4 shows a method performed by the heat recovery system according to the invention.

Further details of a method performed by the heat recovery system according to the invention are described below with reference to FIG. 4 disclosing the method steps and the constructional features are disclosed in FIGS. 1-3. The method is performed by the accumulator inlet controller 533 for use in recovering heat from flue gas 201 generated by combustion at a biomass installation. The method comprises the step of determining 401 at least one of a pressure and temperature of generated flash steam in the waste heat accumulator 300, by means of the waste heat accumulator sensor outlet 531 and its associated waste heat accumulator steam sensor 532 sensing the pressure and/or temperature of the steam in the accumulator 300. Further, the method comprise controlling 402 the pressure in the waste heat accumulator 300 by controlling the flow in at least one of the waste heat accumulator inlet 305, the waste heat accumulator 300 steam outlet 537 or the waste heat accumulator 300 water outlet 538. The controlling is performed in dependence of the determined pressure or temperature of the steam in the accumulator. In particular, the method is directed towards the control of the transport of feed water, heated by flue gas in the flue gas cooler 200, which feed water being provided to the waste heat accumulator 300.

The method may further comprise the method step of controlling 402 the accumulator inlet control valve 301 regulating the flow of feed water to the waste heat accumulator 300 and/or the feed water pump 102 providing feed water to the flue gas cooler 200, based on the output parameters of the liquid inlet controller 533. The method may further comprise the method step of extracting 403 generated flash steam from the waste heat accumulator 300 into the steam net 400, this based on at least one of a desired steam pressure and temperature of the steam net 400. Further, the method may also comprise the method step of closing 404 the accumulator steam non-return valve 535 if the pressure in the waste heat accumulator 300 is below the pressure within the steam net 400.

The determination of the pressure of the steam in the waste heat accumulator 300 could be performed by a steam sensor 532 indicating the pressure of the steam in the waste heat accumulator 300 or calculated from a temperature sensed by a steam sensor 532 sensing the temperature of the steam in the waste heat accumulator 300. In general, it is desired to control the steam in dependence of the pressure, i.e. to achieve a desired steam pressure in the waste heat accumulator. However, steam pressure may be derived from temperature measurements why it could be enough to know the temperature and therefrom derive and calculate the steam pressure.

According to still another embodiment of the invention, the method comprises the control of having a mixture of water and steam in the waste heat accumulator 300 being within a prescribed limit. The limit could for example be a pressure interval or lower pressure limit and a water level interval. In order to control the water and vapour mixture inside the waste heat accumulator to be at a desired level, a level control unit 303 for sensing and controlling the water level inside the waste heat accumulator 300 could be used.

The level control unit 303 could be connected to an accumulator liquid outlet controller 304 for control of the flow of water from the waste heat accumulator water outlet 538. The accumulator liquid outlet controller 304 is in the figures represented by a pump but could also be a valve or a combination of one or several valves and a pump.

The method could also include the use of an accumulator inlet safety valve 302 between said inlet control valve 301 and accumulator liquid inlet 305 being configured to regulate and reduce the feed water pressure by opening and let feed water bleed through the inlet safety valve 302 if the feed water pressure in the heat recovery fluid circuit 111 upstream of the waste heat accumulator 300 is above a predefined limit.

The method could further comprise the step of extracting 403 generated flash steam from the waste heat accumulator 300 into a steam net 400 based on at least one of a desired steam pressure and temperature of the steam in the accumulator 300. In addition, the method could comprise the step of closing 404 an accumulator steam non-return valve 535 if the pressure in the waste heat accumulator is below the pressure within the steam net 400.

The method could also comprise the feature of receiving feed water to the heat recovery fluid circuit 101 from a feed water tank 100 comprised in the feed water main system 101. The feed water could either be taken directly from the feed water tank 100 or from the feed water main system 101 downstream of the feed water tank 100, preferably in close vicinity to the feed water main system 101. Furthermore, the liquid feed water return flow from the heat recovery circuit 101 to the feed water main system 101, after passing through the waste heat accumulator 300, is preferably arranged to flow to the feed water tank (100), either directly to the feed water tank 100 or to a part of the feed water main system (101) upstream of the feed water tank 100. The feed water tank 100 will in this case function as a reservoir and facilitate control of the feed water flow to and from the waste heat accumulator to adapt to differences in the demand of inflow and outflow of fluid to the waste heat accumulator.

The invention further relates to a control arrangement for use in recovering heat from flue gas 201 generated by combustion at a biomass plant installation. The control arrangement comprises an accumulator liquid inlet controller 533 being configured to determine at least one of a pressure and temperature of generated flash steam in a waste heat accumulator 300, and to control at least one of the pressure and temperature by controlling transport of feed water, heated by flue gas 201 in a flue gas cooler 200, being provided to the waste heat accumulator 300. The accumulator liquid inlet controller 533 may be configured to control the flow of feed water to the accumulator 300 by controlling a waste heat accumulator inlet valve 301 and/or by controlling a feed water pump 102 providing feed water to the flue gas cooler 200.

The control arrangement could further comprise an accumulator steam outlet controller 536 configured to provide for extraction of generated flash steam from the waste heat accumulator 300 to a steam net 400 via the accumulator steam outlet 537. In a preferred embodiment is there an accumulator steam non-return valve 535 which based on at least one of a desired steam pressure and temperature of the steam in the waste heat accumulator 300 controls the steam flow. The control of the flow of steam through the accumulator steam outlet 537 is of course also normally dependent on the pressure in the steam net. The accumulator steam outlet controller 536 could for example comprise an accumulator steam non-return valve 535 arranged to close if the pressure in the waste heat accumulator is below the pressure within the steam net 400. The invention further relates to a heat recovery system 10, 11, 12 using feed water from a feed water main system 101 as a heat carrier for recovering heat from flue gas generated by combustion at a biomass plant installation. The heat recovery system 10, 11, 12 comprises:

A heat recovery fluid circuit 111 fluidly connected to a feed water main system 101 via a heat recovery circuit inlet 112 and a heat recovery circuit outlet 113 in order to circulate feed water as a heat carrier in the heat recovery circuit 111.

A flue gas cooler 200 configured to receive flue gas 201 from combustion and transfer heat from the flue gas 201 to feed water in said heat recovery fluid circuit 111.

A waste heat accumulator 300 configured to form part of said heat recovery fluid circuit 111 and receive feed water via a waste heat accumulator feed water inlet 305 provided with an inlet valve 301 in order to control the flow of feed water into the waste heat accumulator 300. The waste heat accumulator 300 is located downstream of said flue gas cooler 200 in order to receive feed water heated by flue gases 201 in the flue gas cooler 200. The waste heat accumulator 300 is further arranged to contain a mixture of water and steam. The steam is produced by flashing the received feed water in order to generate flash steam, and the waste heat accumulator further comprises a steam outlet 537 and a liquid outlet 538. The liquid outlet 538 forms part of the heat recovery fluid circuit 111. Feed water flowing through the liquid outlet 538 will be recirculated to the feed water main system 101 via a heat recovery circuit outlet 113 for return of feed water to the feed water main system 101, and the heat recovery circuit further comprises an accumulator liquid inlet controller 533 including a steam sensor 532 for sensing the temperature and/or pressure of the steam in the waste heat accumulator 300. The sensed temperature and/or pressure is used in order to control a waste heat accumulator inlet valve 301 so as to control the steam pressure within the waste heat accumulator 300 in dependence of the sensed temperature and/or pressure.

A particular advantage by the system is the use of feed water which may be easy available and also can be used directly to be connected to a steam net. The common way of performing a heat recovery from a flue gas cooler is to use some kind of recirculating liquid which may cause problem with accumulation of salts in the liquid and also e need to transfer the heat from the circulating liquid to another fluid which is, or will be converted from liquid to, a gas phase media. In particular the system is working very smoothly when there is a feed water tank in the feed water main system which may be used to enable a more reliable control system, in particular when there is an instant discrepancy between the mass flow into the waste heat accumulator and the outflow from the waste heat accumulator. Over time, these flows must be balanced but there may be instantaneous differing demand for providing fluid to the waste heat accumulator and discarding fluid from the waste heat accumulator. By the use of feed water tank in the main feed water system, there will be a bulk volume of fluid able to make up for a decreased or increased demand of liquid flow to or from the waste heat accumulator. If the feed water is taken from the feed water main system without having a feed water tank, the feed water will be taken out of and returned to a piping system which may not easily allow rapid changes of inflow to or outflow from the waste heat accumulator to be handled by the feed water main system. Hence, it may be harder to be able to control the fluid streams to and from the waste heat accumulator and there may be a need for a separate make up water inflow and possibly relief or safety valves allowing a fluid in liquid or gaseous state to be discarded from the waste heat accumulator if there is no water tank serving as a flexible storage of fluid to be used as heat carrier in the heat recovery fluid circuit. Hence, in a preferred embodiment comprises the heat recovery system 10, 11, 12 the feature of arranging the heat recovery circuit inlet 112 in or downstream of a feed water tank 100 and arranging the heat recovery circuit outlet 113 in or upstream of said feed water tank 100.

The heat recovery system 12 could also be provided with an inflow heat exchanger 700 configured to receive any process fluid which may be makeup water from any process fluid source 701 and feed water from the feed water tank 100, wherein the heat exchanger 700 is further configured to transfer heat from the feed water to the makeup water such that temperature difference between the makeup water and the feed water is reduced.

The heat recovery system could further comprise a return flow heat exchanger 600 configured to receive any process fluid from any process fluid source 601 and feed water from the waste heat accumulator 300. The heat exchanger 600 is further configured to transfer heat from the feed water to the any process fluid such that temperature difference between the cooled off feed water and feed water in the feed water tank 100 is reduced.

The different features of the heat recovery systems 10, 11, 12 may be freely combined within the scope of the invention.

The invention claimed is:

1. A method for use in recovering heat from flue gas generated by combustion at a biomass plant installation, the method comprising:
    directing a flow of feed water from a feed water main system to a heat recovery system comprising a heat recovery fluid circuit, the heat recovery fluid circuit including:
        a heat recovery circuit inlet that is located at a first connection point at which the heat recovery fluid circuit is connected to the feed water main system, and that receives the feed water from the feed water main system,
        a heat recovery circuit outlet that is located at a second connection point at which the heat recovery fluid circuit is connected to the feed water main system, and that returns the feed water to the feed water main system,
        a flue gas cooler arranged downstream of the heat recovery circuit inlet and upstream of the heat recovery circuit outlet, and
        a waste heat accumulator fluidly connected to and arranged downstream of the flue gas cooler in a direction of feed water flow from the heat recovery circuit inlet to the heat recovery circuit outlet,
        wherein the flue gas cooler is arranged to exchange heat between a flue gas and feed water in the heat recovery fluid circuit flowing through the flue gas cooler in order to heat the feed water in the heat recovery fluid circuit before the feed water enters the waste heat accumulator;
    controlling the flow of feed water in the heat recovery fluid circuit to a waste heat accumulator inlet so as to generate flash steam in the waste heat accumulator when the feed water enters through the waste heat accumulator inlet in order to maintain a mixture of liquid and generated flash steam in the waste heat accumulator;
    controlling a flow of steam from a steam outlet in the waste heat accumulator; and
    controlling a flow of feed water from a waste heat accumulator feed water outlet in the waste heat accumulator to be returned to the feed water main system.

2. The method according to claim 1, further comprising:
    determining at least one of a pressure or a temperature of the generated flash steam in the waste heat accumulator; and
    controlling the pressure of the generated flash steam in the waste heat accumulator by controlling the flow through at least one of the waste heat accumulator inlet, the waste heat accumulator steam outlet, or the waste heat accumulator feed water outlet, based on at least one of the determined pressure or the determined temperature of the generated flash steam in the waste heat accumulator.

3. The method according to claim 2, wherein the controlling of any of the flows of feed water or steam is performed based on at least one of the determined pressure or the determined temperature of the generated flash steam in the waste heat accumulator.

4. The method according to claim 2, wherein the determination of the pressure of the generated flash steam in the waste heat accumulator is performed by a steam sensor indicating the pressure of the generated flash steam in the waste heat accumulator or calculated from a temperature sensed by a steam sensor sensing the temperature of the generated flash steam in the waste heat accumulator.

5. The method according to claim 2, wherein the controlling further comprises that the mixture of liquid and generated flash steam in the waste heat accumulator is within a predetermined limit.

6. The method according to claim 5, wherein the method further comprises the use of a level control unit for sensing and controlling a water level inside the waste heat accumulator, the level control unit connected to a liquid outlet controller for control of the flow of water from the waste heat accumulator feed water outlet.

7. The method according to claim 1, wherein the controlling further comprises:
    the use of an inlet valve upstream of the waste heat accumulator to control a flow of feed water into the waste heat accumulator;
    the use of an accumulator inlet safety valve between the inlet valve and the waste heat accumulator inlet, the accumulator inlet safety valve configured to regulate and reduce a feed water pressure by opening and allowing feed water to bleed if the feed water pressure in the heat recovery fluid circuit upstream and in a vicinity of the waste heat accumulator is above a predefined limit.

8. The method according to claim 1, further comprising extracting the generated flash steam from the waste heat accumulator into a steam distribution network based on at least one of a desired steam pressure or a desired temperature of the generated flash steam in the waste heat accumulator.

9. The method according to claim 8, further comprising closing an accumulator steam non-return valve if the pressure in the waste heat accumulator is below the pressure within the steam distribution network.

10. The method according to claim 1, wherein:
    the feed water main system comprises a feed water main tank;
    the heat recovery circuit inlet receives the feed water either directly from the feed water tank or from a part of the feed water main system downstream of the feed water tank; and
    heat recovery circuit outlet returns the feed water either directly to the feed water tank or to a part of the feed water main system upstream of the feed water tank.

11. The method according to claim 1, wherein all of the feed water received by the flue gas cooler is feed water received from the feed water main system via the heat recovery circuit inlet.

12. The method according to claim 1, wherein all of the feed water from the waste heat accumulator feed water outlet is returned to the feed water main system.

13. A heat recovery system using feed water from a feed water main system as a heat carrier for recovering heat from flue gas generated by combustion at a biomass plant installation, the heat recovery system comprising:
- a heat recovery fluid circuit fluidly connected to the feed water main system via a heat recovery fluid circuit inlet that is located at a first connection point at which the heat recovery fluid circuit is connected to the feed water main system and a heat recovery fluid circuit outlet that is located at a second connection point at which the heat recovery fluid circuit is connected to the feed water main system in order to circulate the feed water as the heat carrier in the heat recovery fluid circuit;
- a flue gas cooler arranged downstream of the heat recovery circuit inlet and upstream of the heat recovery circuit outlet, the flue gas cooler being configured to receive flue gas from a combustion and transfer heat from the flue gas to feed water in the heat recovery fluid circuit; and
- a waste heat accumulator configured to form part of the heat recovery fluid circuit and receive feed water via a waste heat accumulator feed water inlet, the heat recovery fluid circuit comprising an inlet valve upstream of the waste heat accumulator in order to control the flow of feed water into the waste heat accumulator, the waste heat accumulator located downstream of the flue gas cooler in a direction of feed water flow from the heat recovery circuit inlet to the heat recovery circuit outlet in order to receive feed water heated by the flue gas in the flue gas cooler, the waste heat accumulator arranged to contain a mixture of water and steam produced by flashing the received feed water in order to generate flash steam, wherein:
- the waste heat accumulator further comprises a steam outlet and a feed water outlet, the feed water outlet forming part of the heat recovery fluid circuit for return of feed water to the feed water main system via a heat recovery fluid circuit outlet; and
- the heat recovery fluid circuit further comprising an accumulator liquid inlet controller including a steam sensor for sensing at least one of a pressure or a temperature of the generated flash steam in the waste heat accumulator in order to control a waste heat accumulator inlet valve so as to control the pressure of the generated flash steam within the waste heat accumulator in dependence of the at least one of the sensed pressure or the sensed temperature of the generated flash steam.

14. The heat recovery system according to claim 13, further comprising a return flow heat exchanger configured to receive process fluid from any process fluid source and feed water from the waste heat accumulator, wherein the return flow heat exchanger is further configured to transfer heat from the feed water to the any process fluid and thereby produce cooled feed water, such that a temperature difference between the cooled feed water and feed water in the feed water main system is reduced.

15. The heat recovery system according to claim 13, further comprising an inflow heat exchanger configured to receive makeup water from any process fluid source and feed water from the feed water main system, wherein the inflow heat exchanger is further configured to transfer heat from the feed water to the makeup water such that a temperature difference between the makeup water and the feed water is reduced.

16. The heat recovery system according to claim 13, wherein the heat recovery fluid circuit inlet is located in or downstream of a feed water tank and the heat recovery fluid circuit outlet is located in or upstream of the feed water tank.

* * * * *